United States Patent [19]

Sipala

[11] Patent Number: 5,090,157
[45] Date of Patent: Feb. 25, 1992

[54] TREE BASKET

[76] Inventor: John R. Sipala, 7 Ridge Dr., Huntington Station, N.Y. 11746

[21] Appl. No.: 713,750

[22] Filed: Jun. 11, 1991

Related U.S. Application Data

[63] Continuation of Ser. No. 422,633, Oct. 17, 1989, abandoned.

[51] Int. Cl.⁵ .............................................. A01G 23/04
[52] U.S. Cl. ................................................................ 47/76
[58] Field of Search ..................... 47/76; 217/122, 71, 217/51, 49, 69; 220/401

[56] References Cited

U.S. PATENT DOCUMENTS

| | | | |
|---|---|---|---|
| 792,061 | 6/1905 | Morley | 217/122 |
| 880,848 | 3/1908 | Wiener | 217/122 |
| 933,206 | 9/1909 | Schmitz | 217/49 |
| 1,393,591 | 10/1921 | Walter | 217/49 |
| 2,507,152 | 5/1950 | Garofalo | 220/401 |
| 2,790,978 | 5/1957 | Tigrett | 220/401 |
| 3,134,196 | 3/1957 | Hansen | |
| 3,415,012 | 12/1968 | Stubbmann | |
| 3,979,856 | 9/1976 | Belcher | |
| 4,062,148 | 12/1977 | Edmonds, Jr. et al. | |
| 4,096,662 | 6/1978 | Anderson | |
| 4,109,442 | 8/1978 | Maasbach | |
| 4,250,664 | 2/1981 | Remke | |
| 4,604,825 | 8/1986 | Mainprice | |

FOREIGN PATENT DOCUMENTS

| | | | |
|---|---|---|---|
| 548794 | 7/1956 | Belgium | 217/122 |
| 1061564 | 4/1979 | Canada | 47/76 |
| 865723 | 2/1953 | Fed. Rep. of Germany | 217/122 |

Primary Examiner—Henry E. Raduazo
Attorney, Agent, or Firm—Hoffmann & Baron

[57] ABSTRACT

The present invention provides a durable tree basket having generally horizontally disposed rings connected by at least one pliable support. In a preferred embodiment of the present invention, the substantially horizontal rings are supported by removable slats, for example, made from wood lath.

19 Claims, 1 Drawing Sheet

TREE BASKET

This is a continuation of copending application(s) Ser. No. 07/422,633 filed on Oct. 17, 1989, now abandoned.

The present invention is directed to a tree basket and, more particularly, to a tree basket having pliable vertical supports.

BACKGROUND

Tree baskets are conventionally used by nurseries which grow trees from seedlings for resale. Typically, a seedling is planted, nurtured for a number of years, and is then removed from the ground for replanting at a different location. It is well known that a certain amount of roots must be transported with the tree in order for the uprooted tree to have an acceptable chance of viability at its new location. The roots and accompanying soil which are transported with the tree are known as the tree "ball". The desired size of the ball is dependent upon several factors including the tree caliper, i.e. diameter of the trunk, and type of tree, or shrub size and have been standardized by American Association of Nurserymen (AAN).

During a typical digging operation, a tree ball is dug either manually or mechanically using well known hydraulic machines. The tree is then lifted and the ball is lowered into a wire tree basket which has been lined with a burlap liner. The tree basket is then secured to the trunk of the tree with rope by repeatedly looping the rope through the top rung of the basket and around the tree trunk. The generally vertical supports of the tree basket provide vertical support to the ball while the horizontal rings provide horizontal support. As the rope is drawn tightly around the trunk, the wire of the basket may yield under the force of the rope, drawing the basket more tightly around the ball. The strength of the wire, however, tends to resist this deformation and spaces are often left between the ball and the tree basket. The ball is obviously not supported at these locations. It will be appreciated by those skilled in the art that a more pliable vertical support would more readily conform and, therefore, provide more complete support to the tree ball.

It is very important that the ball is properly supported during transporting such that no cracks develop. Cracks in the ball tend to destroy the root structure and reduce the probability that the transplanted tree will thrive at its new location.

The most common form of tree baskets are formed of wire as illustrated in U.S. Pat. No. 3,979,856 to Belcher and U.S. Pat. No. 4,250,664 to Remke. These generally frustoconically shaped baskets consist of a number of upwardly extending and diverging wire supports which are spot welded to a number of horizontally disposed wire rings. A typical ring may be formed of five to eight gauge mild steel having a diameter of 3/16 to ¼ inch. Suitable gauge is required in order to withstand the welding steps used in the formation of these wire tree baskets. Another wire tree basket is disclosed in U.S. Pat. No. 4,062,148 to Edmonds, Jr. et al. formed of horizontal wire rings supported by a plurality of upright wire loops which terminate in semi-circular bight sections. The rings and loops are formed of galvanized steel wire and are joined by butt welds. Proper welding procedures are important since weld failure may jeopardize the entire structural integrity of the basket thereby risking the proper support of the ball.

After a conventional wire tree basket has been placed in the ground at the tree's new location, it is desirable to cut segments of the basket in order to minimize the possibility of root strangulation. The conventional baskets require the use of a pair of wire cutters to make such cuts. Since the conventional wire baskets of the prior art rely on welding, they are labor intensive or, alternatively, require a high capital outlay for machinery before a manufacturer can enter the tree basket industry. Furthermore, such baskets often lack adequate tie-off points for securing the tree basket to the trunk.

Another device designed for transplanting and transporting trees is the tree cradle disclosed in U.S. Pat. No. 4,604,825 to Mainprice which comprises a body consisting of an upper rim member in the shape of a closed circular loop, an intermediate hoop member and a bottom wall. Two main strap members and four auxiliary upright strap members are formed integrally with the rim and hoop member.

Other devices have been disclosed for containing the roots of plants during growing and/or transporting such as the devices disclosed in U.S. Pat. No. 4,109,442 to Maasbach, U.S. Pat. No. 4,096,662 to Anderson, and U.S. Pat. No. 3,415,012 to Stubbmann. Such devices are not designed for tree balls and are, therefore, not suitable for use as tree baskets.

In light of the shortcomings of the conventional wire tree baskets known in the art, a tree basket which provides better support is needed. Furthermore, it would be desirable to provide a tree basket which is easier and less expensive to manufacture than tree baskets heretofore known in the art.

SUMMARY OF THE INVENTION

The present invention provides a tree basket having generally horizontally disposed rings connected by pliable vertical supports, e.g. natural or synthetic cord. In a preferred embodiment of the present invention, the substantially horizontal rings are supported by removable rigid vertical supports which support the basket during the digging operation.

DETAILED DESCRIPTION

The tree basket of the present invention avoids the shortcomings of the prior art by providing a tree basket having pliable vertical supports made, for example, of sisal or synthetic cord. In accordance with a preferred embodiment of the present invention, the pliable vertical supports are attached to a plurality of substantially horizontally disposed rigid rings. In order to avoid undue repetition, as used herein, the term "tree" is intended to include trees and shrubbery.

Figure 1:
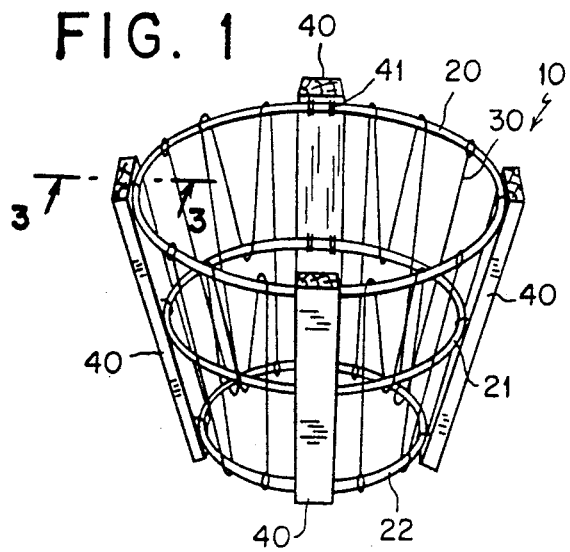
FIG. 1 is a perspective view of one embodiment of the tree basket of the present invention.

With reference to FIG. 1, one embodiment of the tree basket 10 of the present invention comprises three substantially horizontally disposed wire rings 20, 21, 22 of different diameters. As illustrated, the rings are preferably arranged such that upper ring 20 has a greater diameter. For example, in a 28 inch tree basket, the upper ring 20 has a diameter of 28 inches while middle ring 21 has a diameter of about 24 inches and lower ring 22 has a diameter of about 20 inches. Other ring size arrangements can be utilized including rings having the same size.

The substantially horizontally disposed rings are attached to a pliable support 30 which provides vertical support to the ball. As illustrated in FIG. 1, the pliable vertical support 30 is attached to the upper ring 20 and is looped around the bottom ring 22 and middle ring 21 in alternating fashion. In accordance with the present invention, the pliable vertical support 30 may be formed of a continuous element looped around the horizontal ring members or may comprise a plurality of separate elements which are repeatedly secured to the horizontal ring members as illustrated. The pliable vertical support 30 may be formed of any suitable material having the sufficient strength to support the heavy loads incurred during the transporting of a tree, including sisal and nylon cord. While the pliable vertical support 30 is illustrated as only looping around the rings 20-22 about five times for each quadrant of the basket 10, a greater or lesser number of loops may be utilized depending upon the strength of the vertical support 30 and the desired end use of the basket 10.

Figure 3:
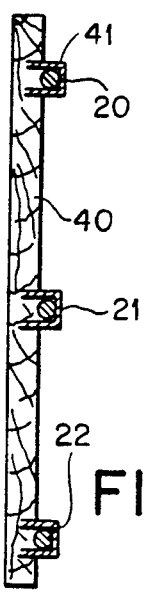
FIG. 3 is a cross-sectional side-view of a slat of the tree basket of FIG. 1.

In order to facilitate the placement of a tree ball into the tree basket illustrated in FIG. 1, a number of rigid vertical supports 40 are provided to hold the horizontal rings in position. According to this preferred embodiment of the present invention, the rigid vertical supports 40 are removably attached on the outside of the tree basket. The rigid vertical supports 40, which may be slats formed of wood lath or another substantially rigid material, are fastened to the rings 20-22 on the outside of the tree basket with staples 41. FIG. 3 illustrates the attachment of the rigid vertical support 40 to rings 20-22 by staples 41. According to this embodiment of the present invention, after the tree ball has been placed into the tree basket 10, the rigid vertical supports 40 may be easily removed from the basket 10 before, after or while the basket 10 is being secured to the trunk, by simply tugging on the rigid vertical supports 40 to remove them from the basket 10.

The rigid side supports 40 could also be disposed on the interior of the tree basket or within some of the horizontal rings and outside the remaining rings. The arrangement of the rigid side supports 40 will depend upon the particular preferences of the nurseryman. In certain circumstances, it may be preferable to leave all or a portion of a rigid side supports 40 attached to the tree basket during the transportation process in order to provide broader support to the tree ball. When the rigid side supports 40 are positioned totally outside of the tree basket, the total removal of these side supports after a tree has been placed into the basket is made easier. In this fashion, when the tree basket is secured to the tree in the manner described above, the rings are more readily drawn into contact with the ball.

Figure 2:
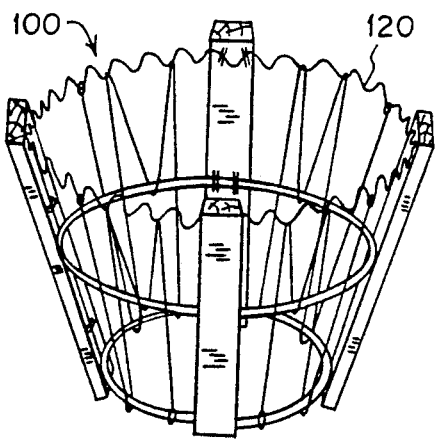
FIG. 2 is a perspective view of an alternative embodiment of the present invention.

In accordance with an alternative embodiment of the present invention illustrated in FIG. 2, the top ring 120 of the tree basket 100 is scalloped to facilitate securing the tree basket 100 to the trunk of a tree. The use of scalloped ring 120 makes it easier for a nurseryman to loop a cord around the top ring when the tree basket 100 is being secured to the trunk of a tree.

While the embodiments of the present invention illustrated in FIGS. 1-3 have open bottoms, it may be desirable to provide additional support to the tree ball within the bottom ring. To this end, the bottom ring may be partially or totally closed by rigid and/or pliable supports such as those used for the sides.

Figure 4A:
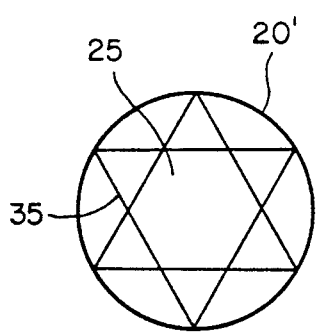
FIGS. 4(a)–(e) are top views of bottom rings of alternative embodiments of the tree basket of the present invention.

As illustrated in FIGS. 4(a) and (e), pliable supports 35 can be joined to the bottom ring 22' in a manner which allows a central opening 25 for the tap root of the tree. In this manner, the size of the central opening 25 can be easily varied by varying the point on bottom ring 22' to which pliable support 35 is fastened.

Figure 4B:
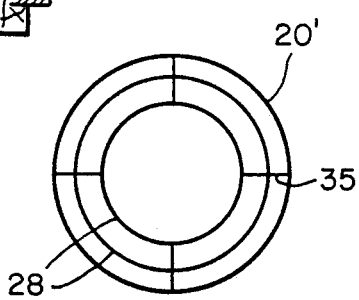
Figure 4C:
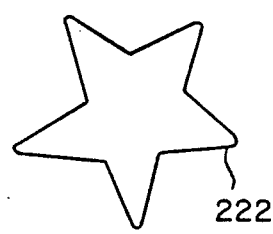
Figure 4D:
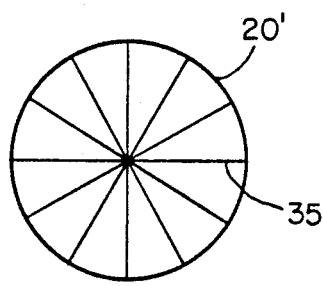
Figure 4E:
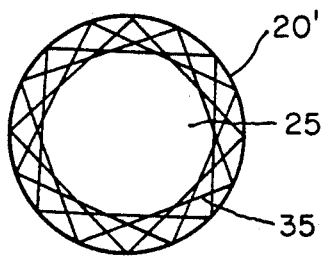

Alternatively, the entire bottom of the tree basket can be supported by attaching some or all of the pliable supports 35 to ring 22' such that pliable supports 35 cross the center of the bottom opening as illustrated in FIG. 4(d).

With reference to FIGS. 4(b), in an alternative embodiment of the present invention, the bottom opening is partially supported by rigid supports 28 which are attached to bottom ring 22' by resilient supports 35. The pliable supports 35 can be formed of the same materials as vertical supports 30.

In still another embodiment of the present invention illustrated in FIG. 4(c), the bottom ring 222 is formed in an irregular "star" shape which protrudes partially into the bottom opening of the tree basket. Outer portions of irregularly-shaped bottom ring 222 are positioned for connection with a rigid vertical support (not shown).

In accordance with an alternative embodiment of the present invention, the horizontal rings may be formed of a semi-pliable material such as nylon, other natural and/or synthetic materials or compositions. In a manner similar to the embodiment illustrated in FIGS. 1-3 described above, a plurality of pliable horizontal rings is fastened to a pliable vertical support. The pliable horizontal support is supported by a number of rigid slats in the same fashion as illustrated in FIG. 3.

Those skilled in the art will appreciate that the pliable vertical supports of the tree baskets of the present invention will more readily conform to the sides of a tree ball and, therefore, will provide better support to the ball. These supports do not require expensive welding and, after the ball has been placed in the ground at a new location, can be cut easier than the wire baskets known in the art.

What is claimed is:

1. A tree basket adapted to receive a root ball having a predetermined diameter and height comprising:
    a plurality of horizontally disposed rigid support rings including at least one upper ring and a lower ring, said upper ring having a diameter greater than the diameter of said root ball and said lower ring having a diameter smaller than said upper ring,
    at least one substantially vertical, flacid support member fastened to said rigid rings to enclose a substantial portion of said predetermined height for supporting said ball, and
    means for supporting said rings whereby said rings are maintained in freestanding, vertically spaced relation to readily receive said ball.

2. A tree basket according to claim 1 wherein said supporting means comprises a plurality of releasably-attached, rigid, substantially vertical supports.

3. A tree basket according to claim 1 wherein there are at least three horizontally disposed rigid rings and said horizontally disposed rigid rings have different diameters.

4. A tree basket according to claim 1 wherein said tree basket has an upper ring formed with scalloped portions.

5. A tree basket according to claim 1 further comprising a plurality of releasably-attached rigid, substantially vertical supports.

6. A tree basket according to claim 5 wherein said removable, rigid, substantially vertical supports comprise wood lath.

7. A tree basket adapted to receive a root ball having a predetermined diameter and height comprising:
- a plurality of substantially horizontal, substantially rigid wire supports including at least one upper support and a lower support, said upper support having an opening greater than the diameter of said root ball and said lower support having an opening smaller than said upper support,
- at least one flacid cord, disposed substantially vertically and fastened to said supports to enclose a substantial portion of said predetermined height for supporting said ball, and
- means for supporting said rigid supports whereby said rigid supports are maintained in freestanding, vertically spaced relation to readily receive the ball.

8. A tree basket according to claim 7 wherein said supporting means comprises a plurality of removably attached, rigid, substantially vertical supports.

9. A tree basket according to claim 7 further comprising a plurality of removably attached, rigid, substantially vertical supports.

10. A tree basket according to claim 9 wherein said removable, rigid, substantially vertical supports comprise wood lath.

11. A tree basket according to claim 9 wherein said removably attached, rigid vertical supports are attached to said substantially horizontal supports with staples.

12. A tree basket according to claim 7 comprising at least three rigid, substantially horizontal supports.

13. A tree basket according to claim 7 wherein said substantially horizontal supports comprise a rigid, lower ring disposed at the bottom of said basket.

14. A tree basket according to claim 13 wherein said lower ring is non-circular.

15. A tree basket according to claim 13 wherein at least one pliable, horizontal support is disposed within said lower ring.

16. A tree basket according to claim 13 wherein at least one rigid, horizontal support is disposed within said lower ring.

17. A method of transplanting a tree growing in the ground comprising the steps of:
- removing said tree from the ground while leaving a root ball having a predetermined diameter and height on a lower portion of said tree;
- providing a tree basket adapted to receive said root ball comprising a plurality of horizontally disposed rigid support rings including at least one upper ring and a lower ring, said upper ring having a diameter greater than the diameter of said root ball and said lower ring having a diameter smaller than said upper ring,
- at least one, substantially vertical, flacid support member fastened to said rigid rings to enclose a substantial portion of said predetermine height for supporting said ball, and
- means for supporting said rings whereby said rings are maintained in vertically space relation to readily receive said ball;
- placing said root ball into said tree basket; and
- securing at least one of said rings to said tree.

18. A tree basket according to claim 1 wherein said vertical support member comprises a cord.

19. A tree basket according to claim 1 further comprising a burlap liner.

* * * * *